July 21, 1936.  A. F. DORMEYER  2,048,183
ELECTRIC FOOD MIXER
Filed Dec. 23, 1929  5 Sheets-Sheet 1

Inventor:
Albert F. Dormeyer
By Williams, Bradbury, McCaleb & Hinkle
Attys.

July 21, 1936.   A. F. DORMEYER   2,048,183
ELECTRIC FOOD MIXER
Filed Dec. 23, 1929   5 Sheets-Sheet 2

July 21, 1936.  A. F. DORMEYER  2,048,183
ELECTRIC FOOD MIXER
Filed Dec. 23, 1929  5 Sheets-Sheet 4

Inventor:
Albert F. Dormeyer
By Williams, Bradbury, McCaleb & Hinkle
Attys.

Patented July 21, 1936

2,048,183

UNITED STATES PATENT OFFICE 2,048,183

ELECTRIC FOOD MIXER

Albert F. Dormeyer, Chicago, Ill., assignor, by mesne assignments, to Hamilton Beach Manufacturing Co., Racine, Wis., a corporation of Wisconsin Application December 23, 1929, Serial No. 416,027

10 Claims. (Cl. 259—131)

The present invention relates to electric food mixers, and is particularly concerned with portable household food mixers adapted to be used in the preparation of all kinds of foods.

While the preferred embodiment, which has been chosen to illustrate the invention, is a food mixer, the invention also includes a motor unit which is peculiarly adapted to be utilized for all kinds of household appliances or power driven devices in the home or elsewhere. The present electric motor unit is also adapted to be used with many other attachments, such as fruit juice extractors, meat grinders, vegetable slicers, cream whippers, fans, massaging devices, floor and furniture polishers, emery wheels, polishing wheels, etc., and the use described is to be regarded as exemplary of one of the many uses of a portable power plant or motor unit which is universally applicable to household labor.

The food mixing devices of the prior art have not been provided with power units having sufficient range or flexibility of power and speed control for performing the different kinds of mixing or other labor required of such a device, and consequently, the prior devices were not adaptable to both high-speed and low-speed requirements. For example, the speed which is required for whipping cream or mixing light liquids is vastly different from that required for mixing dough for bread, and the devices of the prior art could not perform either or both of these functions with the perfection or rapidity which is desirable in a commercially successful machine.

Some effort has been made to adapt mixing devices to different kinds of work by the use of alternative gear ratios, but only a very limited number of speeds could be secured by such an arrangement, and such devices are complicated, noisy, unwieldly and incapable of satisfactory performance.

The prior devices have also been too heavy, and too large to be handled conveniently by women, expensive, difficult to clean, and difficult to operate or control.

One of the objects of the present invention is the elimination of the foregoing difficulties by the provision of an improved food mixer having such a wide range of power and speed control as to be adaptable to practically all kinds of household labor.

Another object is the provision of a portable food mixer of the class described, which is light in weight, relatively small in size, and compact in construction, so that the device may be conveniently controlled and handled without physical effort, yet it includes a power source of sufficient strength to perform all types of physical household labor, and self-contained controlling devices which make the portable machine adaptable to the many different speed requirements for such labor.

Another object is the provision of a novel self-contained unit for household appliances, which includes speed reduction devices to permit the electric unit to operate at its most efficient speed, and speed controlling means to make the power unit capable of use with all kinds of household appliances having various speed requirements.

Another object is the provision of an improved portable food mixer which is adapted to stand by itself in a container or upon any supporting surface during the mixing operation or at other times, in order to eliminate the necessity for constant attention so that the operator may leave the mixer to secure other ingredients, or to give attention to other urgent matters, during the mixing operation.

Another object is the provision of an improved mixing unit which does not include any other gearing or mechanism that should not be placed in water, thereby facilitating the cleaning of the mixing elements without wetting any of the mechanism.

Another object is the provision of an improved guard which positively prevents any of a plurality of paddles or beaters from striking the side of bowls or receptacles of any size, thereby preventing noisy operation or injury to the mixing unit or bowl, such as would result if the radially extending paddles could strike the wall of the bowl, so that the mixer may be used with the most fragile bowls or bowls of any size.

Another object is the provision of an improved mixing unit structure, which has no food collecting recesses, or inaccessible or difficult places to clean, so that the mixing elements may be readily cleaned with running water, by operating the mixer in a bowl of water, or by simply removing and washing the mixing unit separate from the gearing or motor.

Another object is the provision of an improved portable household appliance which is capable of beating, mashing, mixing, whipping, pulverizing, or stirring wet or dry food products of every consistency from thin liquids to thick batters or dry mixtures, with a variable speed control for every different power or speed requirement.

Another object is the provision of an improved paddle structure of the Dover type which is peculiarly simple and sturdy, easy to maintain in clean condition, and capable of economical manufacture and assembly.

Another object is the provision of a portable electric food mixer, which may be safely left connected for convenient use and control by means of a self-contained switch located in the motor casing, and the paddles of which may be safely cleaned by running water while the motor is in operation.

Another object is the provision of an improved portable food mixer having a detachable mixing unit, which is secured to the motor unit by a firm and positive, yet quickly detachable, connecting device, so that the mixer unit may be safely and securely connected to the motor unit to support the same, but the mixing unit may be readily removed for cleaning, and the motor unit may be applied to many other types of appliances.

Other objects and advantages of the invention will be apparent from the following description and from the accompanying drawings, in which similar characters of reference indicate similar parts throughout the several views.

Referring to the drawings, of which there are five sheets.

Figure 1:
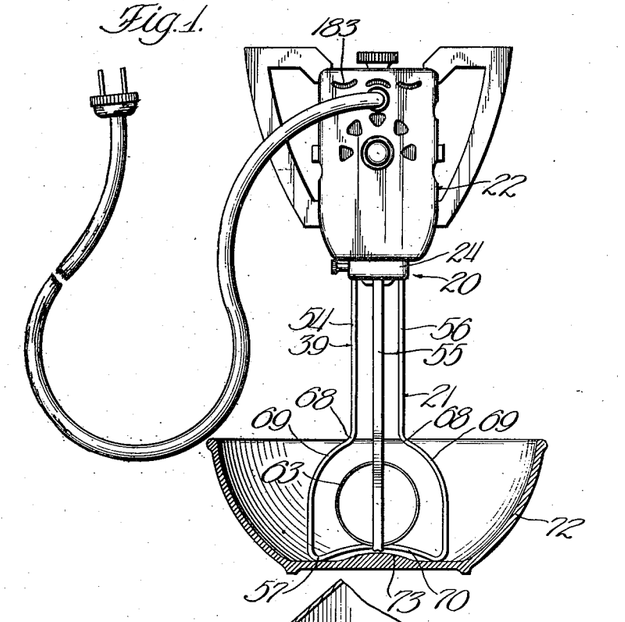
Fig. 1 is an elevational view of the portable food mixer in erect and operative position in a round bowl.
Figures 2, 4, 5, 6:
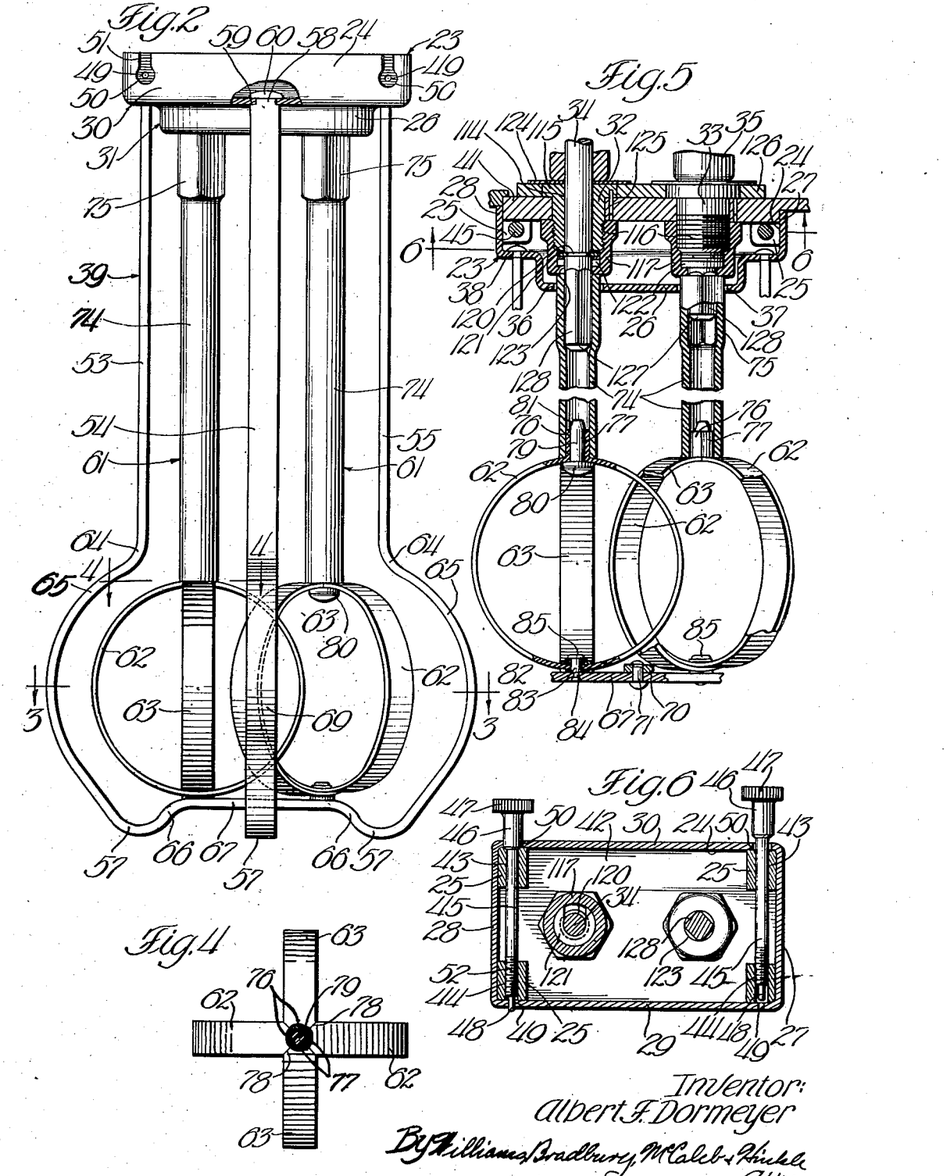
Fig. 2 is a full size elevational view of the agitator unit, partially broken away to show the structure.
Fig. 4 is a detail sectional view taken on the plane of the line 4—4 of Fig. 2, looking in the direction of the arrows.
Fig. 5 is a vertical sectional view taken on a plane determined by the axes of the drive shafts, with certain of the parts in elevation.
Fig. 6 is a sectional view taken on the plane of the line 6—6 of Fig. 5, looking in the direction of the arrows.
Figure 3:
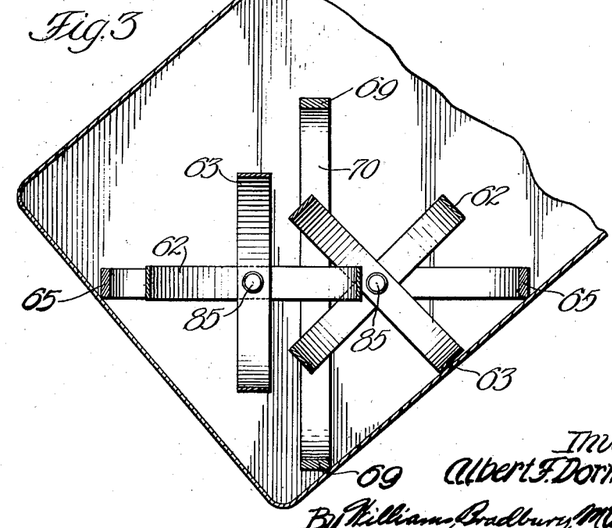
Fig. 3 is a diagrammatic sectional view taken on the plane of the line 3—3 of Fig. 2, showing the relation of the beaters and guard with respect to a flat walled receptacle.

Referring to Figs. 1 to 3, the present electric food mixer, which is indicated in its entirety by the numeral 20, preferably consists of a separate agitator unit 21 and a separate motor unit 22. Both of these parts comprise unitary articles of manufacture, and the motor unit in particular is capable of use as a power plant with many different types of household appliances, of which the agitator unit or agitator attachment is one example.

The present food mixer is preferably made portable in order to widen its field of utility and adapt the food mixer for use in mixing food in all kinds of household utensils. While the present device is extremely sturdy and capable of long and efficient service, all excess weight has been eliminated by the provision of an improved structure, so that the complete mixer is so light that very little effort is required on the part of the user.

One of the primary purposes of the food mixer being to save physical effort on the part of the user, some of the objects of the present invention would be defeated if excessive physical effort were required for handling the mixer, and the present portable device possesses an adaptability and flexibility in its application to various household labors, which was not present in the devices of the prior art.

In order to eliminate the necessity for constant attention to the food mixer when the device is in operation or between successive operations when the agitator unit may be covered with the batter, or other ingredients which it is mixing, the mixer is preferably provided with a stable supporting member, such as the agitator unit 21, which is adapted to support the complete device in erect position under a large variety of different conditions, one of which is illustrated in Fig. 1.

For this purpose, it is also desirable that the motor unit 22 be provided with inherent balance and connected to the agitator unit 21 symmetrically so that the mixer is not overbalanced upon any side.

It is thus unnecessary to hold the food mixer in erect position as in Fig. 1, and under ordinary conditions, the food mixer is adapted to maintain such position without tipping while the motor and agitator unit are operating at full speed. The user may thus leave the mixer to secure additional ingredients, as for instance, when another egg is desired in the mixing of cake batter, or the device may be left during the mixing operation to attend to other urgent duties, such as the observation of other food in the process of cooking.

This inherent capability of standing alone is also of material advantage whenever the mixer has been stopped since it will be evident that it is undesirable to remove the mixer from the batter and wash it until the mixing has been completed, and it is also undesirable to permit the mixer to lie on its side with the agitator above the bowl, because the batter might then run down the agitator shafts, which are tilted downward in inverted position.

It will be noted, therefore, that the inherent stability of the food mixer is a very important advantage which is not present in the devices of the prior art, and which contributes in a large measure to the elimination of the inconvenient operating characteristics of the prior devices.

The agitator unit is shown in elevation in the full size drawing, Fig. 2, and this unit preferably includes a supporting member or plate 23, a guard indicated in its entirety by the numeral 39, and one or more agitators 25. The supporting plate 23 forms a part of a positive and safe, yet quickly detachable, connection between the agitator unit 21 and motor unit 22, and for this purpose, a supporting plate 23 is provided with a socket 24 adapted to receive complementary male members or lugs 25 carried by motor unit 22.

The plate 23 may be conveniently formed of a sheet metal stamping of substantially rectangular form, having a bottom 26 and upwardly extending side flanges 27, 28, 29 and 30, forming the socket 24. In the present embodiment, the plate 23 is also formed with a centrally located stamped depression 31, providing additional space within the socket 24 for receiving and enclosing the bushings 32, 33, and other mechanism for rotatably supporting the drive shafts 34, 35. The stamped depression 31 is provided with a pair of apertures 36, 37 for receiving the drive shafts 34, 35. The bottom 26 of the plate 23 is provided with a plurality of apertures 38 used in securing the guard 39 to the supporting plate 23.

Figure 9:
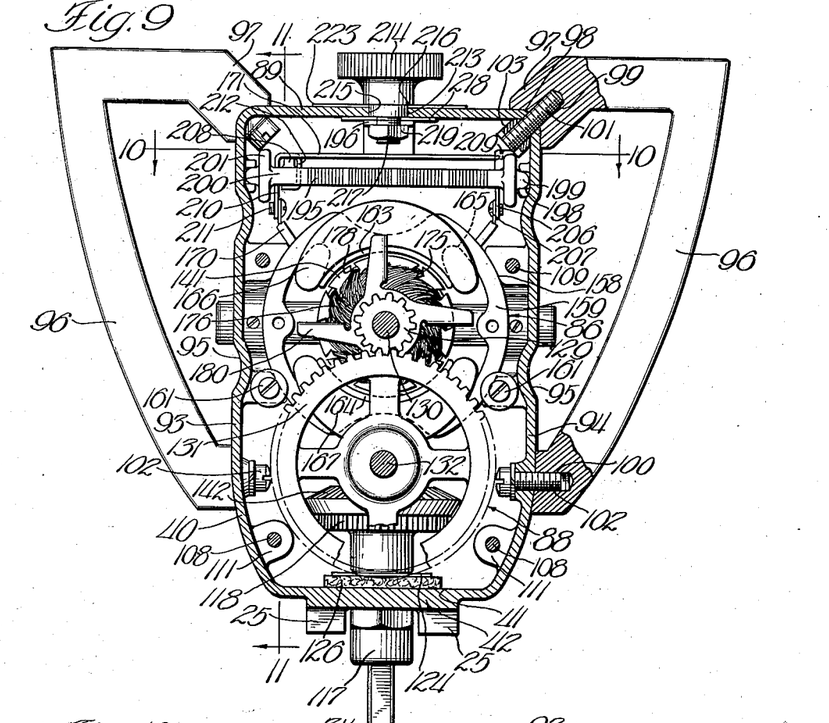
Fig. 9 is a vertical sectional view taken on the plane of the line 9—9 through the casing with the internal mechanism in elevation.
Figure 10:
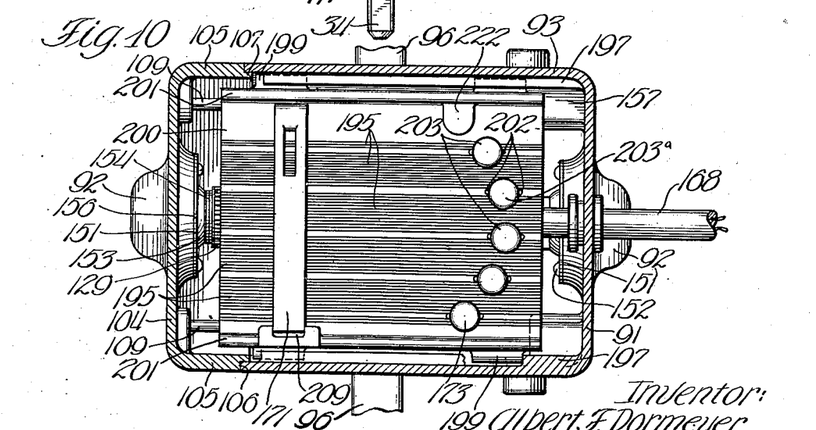
Fig. 10 is a horizontal sectional view taken on the plane of the line 10—10 through the motor unit, showing a plan view of the rheostat.

Referring to Fig. 9, it will be observed that the casing 40 of the motor unit 22 is provided at its bottom 41 with a projecting body 42 for the purpose of securing the supporting plate 23 of the guard. The body 42 is preferably complementary in cross-section to the socket 24 formed in plate 23, and in the present embodiment, both the socket 24 and body 42 are made rectangular in shape.

In order to decrease the weight of the assembly and make room for other mechanism, the body 42 is of limited depth, and is provided with the outwardly projecting lugs 25 located at each corner of the body, and adapted to engage in the corners of the socket 24 to perform the function of providing a firm and positive engagement between the agitator unit and the motor unit.

The lugs 25 and body 42 are thus adapted to be slidably received in the non-circular socket 24, the plate 23 concealing and enclosing the mechanism associated with the drive shafts 34 and 35. In order to maintain these parts in assembled relation, the lugs 25 are provided with transverse bores 43, 44 for receiving threaded members 45, such as screw bolts having enlarged bodies 46 adjacent the knurled head 47.

The outer end of the screw bolts 45 may be provided with points 48 of reduced diameter to improve the appearance, decrease the weight, and cooperate with relatively small apertures 49 formed in the flange 29 of supporting plate 23. The opposite flange 30 is provided with enlarged apertures 50 adapted to register with the bore 43 and receive the enlarged cylindrical body 46 and screw bolt 45, but the apertures 50 are preferably formed with slots 51 of sufficient width to pass the screw bolt 45 when the screw bolt has been moved out to the position of the right-hand bolt in Fig. 6.

The bore 44 of the lug 25, which is located adjacent the outer end of bolt 45, is threaded, and the outer end 52 of bolt 45 is threaded to be received in bore 44. The bore 43 is made of greater diameter than bore 44 in order to pass the threads on the end 52 of bolt 45 so that the bolts 45 may be inserted from the top in Fig. 6.

It will thus be observed that when both the bolts 45 are withdrawn to the position shown with respect to the right-hand bolt of Fig. 6, the ends 48 of the bolts 45 are withdrawn from the apertures 49, and the enlarged portions 46 of the bolts 45 are withdrawn from the apertures 50. Since the slot 51 will pass the body of the bolt 45, the supporting plate 23 may then be slid off the body 42 and lugs 25, and the agitator unit may be readily removed by merely giving the bolts 45 a few turns and pulling the agitator unit away from the motor unit.

The agitator unit may be secured to the motor unit by placing the cup or socket 24 about lugs 25 and body 42, after which the bolts 45 are turned from the position of the right-hand bolt in Fig. 6 to the position of the left-hand bolt in Fig. 6. During this operation, the points 48 of the bolts 45 engage in apertures 49 and the enlarged bodies 46 of bolts 45 engage in apertures 50. Since the enlarged portion 46 of bolt 45 will not pass the slot 51, the supporting plate 23 is securely and simultaneously fastened at both sides or flanges of the plate by the bolts 45, and the present fastening device is adapted to secure these units together so that there is no possibility of inadvertent separation.

The securing or connecting device is simple and effective, yet quickly detachable, and there are no loose parts which may be lost when the motor unit is disconnected from the agitator unit, because the bolts are intended to be left in the position of the right-hand bolt in Fig. 6, and it is not necessary or desirable to remove the bolts entirely.

The guard 39 preferably includes a plurality of vertically extending frame members 53, 54, 55, 56, carried by the supporting plate 23 and formed with a plurality of feet 57 for engaging the bottom of a bowl or other support. The frame members 53—56 are preferably formed of relatively stiff strips of metal, such as steel, and the frame member 55 may consist of a continuation of the frame member 53. Each of the frame members 53—56 is provided with an end portion 58 of reduced width at its upper end, forming shoulders 59, and the end portions 58 are adapted to be received in the apertures 38 of supporting plate 23, so that the guard 39 may be secured to the supporting plate by riveting over the ends as at 60.

The supporting plate 23 is thus confined between the shoulders 59 and the riveted end 60 on each frame member of guard 39. The present agitator unit preferably includes a pair of separate beaters or agitators 61, arranged side by side with interengaging beater members 62, 63, and the frame members 53, 55 are preferably located in substantially the same plane with the drive shafts 34, 35 to guard the outermost parts of the beater members 62, 63. Thus the frame member 53 is provided with a relatively straight body portion which extends longitudinally in the direction of the drive shafts 34, 35, but the frame member 53 is bent outward at 64, and provided with a curved guard portion 65, which may conform somewhat to the shape of the beater members 62, 63. The curved portion 65 of frame member 53 terminates at the bottom in a downwardly curved portion which has been called a foot 57, after which the frame member is bent upward at 66 and it extends substantially horizontally at 67. The opposite frame member 55 may be identical in shape, the two frame members being joined at the horizontal portion 67 and formed of a single integral strip of metal.

Referring to Fig. 1, the frame members 54, 56 also include longitudinally extending body portions which are secured to the supporting plate 23 in the manner just described. Since these frame members are located transversely to the plane of the drive shafts 34, 35, the beater members 62, 63 do not project so far in this direction, and each of the frame members 54, 56 may be bent outward at 68, and curved downward at 69, terminating in a downwardly curved portion or foot 57, and joined by an upwardly curved portion 70, which engages the horizontal portion 67 of the frame members 53, 55.

The portions 67, 70 of the guard are preferably firmly secured together, as for instance, by a rivet 71, thereby holding these parts in fixed relation at the bottom, and accordingly increasing the rigidity of the complete guard. Since the guard 39 is provided with a plurality of spaced feet 57, it is peculiarly adapted to stand upright in bowls of all kinds, particularly bowls 72 of the type illustrated in Fig. 1, having a projection 73 centrally located in the bottom of the bowl.

The feet 57 engage the relatively flat portions of the bowl on either side of the projection 73, and the upwardly curved portions 66 and 70 of the guard 39 prevent interference between the guard and the bowl. The downwardly curved portions 57 on the metal strip, which form the guard 39, are also peculiarly adapted to cam away any nuts, raisins, or other particles of food, which might otherwise remain beneath a plane supporting surface, and the curved feet 57 have been found very effective to automatically locate themselves in a stable position upon the bottom of a bowl full of food ingredients.

The beating elements 61 are preferably identical in shape and construction, and consequently, it is only necessary to describe one of these beating elements in detail. Each beating element 61 preferably consists of a tubular shaft 74, the upper end of which has been deformed to provide a non-circular portion 75, which forms a socket of similar shape for receiving the non-circular end of a drive shaft 34 or 35. The lower end of the tubular shaft 74 supports the beating elements 62, 63, which preferably consist of a pair of sheet metal strips, such as steel, bent to substantially circular form and having their ends secured to the tubular shaft 74.

Thus the paddle 62 comprises a substantially circular band of metal having two upwardly projecting ends 76, 77, and the paddle 63 may be similar in form. The strips, of which the paddles 62, 63 are made, are preferably considerably wider than the interior of the shaft 74, and consequently, the edges of the paddles 62, 63 are tapered as at 78 adjacent the upwardly bent ends 76, 77, and formed so that when the ends 76, 77 are located within the tube 74, the tapered edges 78 fit against each other and prevent relative rotation of one paddle with respect to the other.

The outwardly extending ends 76, 77 of the paddle 63 are similar in form to the ends on the paddle 62, and all of these end portions are preferably reduced in width, so that they are adapted to form a composite tubular member of a size adapted to be received within the tube 74. The paddles may thus be secured to the shaft 74 by means of a driven member 79 of substantially cylindrical form, having a head 80 and a tapered end 81 for camming the ends 76, 77 into proper position during the driving operation.

The driven member 79 secures the paddles to the shaft 74 with the edges of the respective strips in position to reinforce and support each other, and the stud 79 is maintained in its position by frictional engagement with the end portions 76, 77, and by the tension of the tube 74 about the stud 79.

The paddles 62, 63 are each provided with a pivotal connection to the horizontal portion 67 of the guard 39, and the paddles 62, 63 of each beater element are preferably each formed with apertures for a rivet 82 of brass or other bearing metal, which is provided with a reduced portion 84 and a head 85. The reduced portion 84 is riveted to the horizontal part 67 of guard 39, forming a fixed pivot stud for rotatably supporting the lower end of the beater element 61, and for permanently maintaining the assembly of beater elements and guard. Spacing members 83 are preferably interposed between the paddles and head of rivet 82 and between the paddles and the guard. The upper end 75 of each tubular shaft 74 is rotatably supported in one of the apertures 36, 37 of the supporting plate 23, so that the agitators are constantly maintained in power position with the guard.

Referring to Fig. 3, this is a diagrammatic illustration of one example of the relation between the guard 39 and the agitators 61 for preventing the paddle from hitting the side of the mixing bowl or receptacle. In order to prevent the clatter which would otherwise result from the periodic striking of the bowl by the paddles 62, 63, the outwardly curved portions 65, 69 of the guard 39 are so located with respect to the paddles 62, 63 that the paddles are spaced from the wall of the bowl to prevent engagement between the paddles and bowl.

Thus in Fig. 3, at the right-hand side, it will be observed that the portions 65, 69 of the guard project beyond the paddle 63, so that a line drawn between the points 65, 69 is located outside of paddle 63. The guard illustrated in Fig. 3 is peculiarly adapted to prevent interference between the paddles and the wall of a vessel having plane sides, but since the ordinary mixing vessels are usually round bowls, some embodiments of the invention need not have the guard portions 65, 69 project so far in a lateral direction.

It will be evident from Fig. 3 that in order to prevent interference between the paddles and the wall of a curved bowl, the paddle 63, for example, need only be located within a curved wall 72 when the outer portions 65 and 69 of the guard engage the wall.

In many embodiments of the invention, it will be sufficient, therefore, to adapt the guard to prevent interference between the paddle and bowls of ordinary size, and it will not be necessary to extend the guard sufficiently for use with flat sided vessels as taught by the present description.

It will thus be observed that the present agitator unit is peculiarly adapted to maintain itself in erect position in the mixing bowl, and also to support the motor unit in the same position when the motor is still or while the motor is operating. The guard is peculiarly adapted to prevent interference between the paddles and bowl so that the paddles cannot strike the side of the bowl, and it is possible to use the present mixer with the most fragile bowl without possibility of the bowl being broken by the paddle, and without the clattering noise, which would inevitably result from the paddles of the prior art.

The tubular beater shafts and paddle construction are also peculiarly adapted to be very easily cleaned, because there are no recesses which retain particles of food, nor are there any difficult or inaccessible places to clean as distinguished from the devices of the prior art, in which the paddles invariably consist of elongated metal strips instead of tubular shafts.

The entire agitator unit may be readily removed from the motor unit without any mechanism such as gears or other parts that might be damaged by washing, and the agitator unit may be washed in the ordinary way of washing dishes, or by running the food mixer with the agitator unit in a bowl of cleansing fluid, such as soap and water. All of the metal parts of the agitator unit are preferably plated with corrosion resisting metal, such as chromium, and the casing 40 for the motor is preferably formed of a light aluminum alloy, capable of receiving a finish which is similar in appearance.

Referring to Figs. 7 to 12, I shall now describe in detail the features of an electric motor unit which is peculiarly adapted to provide a source of power for the agitator 21 for performing all kinds of mixing, beating or pulverizing operations. The electric motor unit 22 preferably consists of a unitary motor casing 40, which encloses and protects the motor 86, a speed control device 87, and a speed reduction device 88. The exact shape of the casing 40 does not affect the merits of the invention, except that it is highly desirable that the arrangement be light and compact, and a very efficient, sturdy and powerful motor unit is provided by the specific arrangement illustrated.

The motor unit is illustrated in full size in the figures just mentioned, and the entire mixer is so light that it may be handled without appreciable physical effort, yet it is capable of performing many new functions besides all of the results which have been accomplished by the large heavy and complicated mixing devices of the prior art.

In the present embodiment, the motor casing 40 is provided with a substantially plane upper wall 89, front and rear walls 90, 91, which are plane except for the provision of bearing sockets 92, a bottom wall 41, which has already been described, and side walls 93, 94, which are substantially plane at their upper portions but curved inwardly adjacent the bottom of the casing. The transversely extending grooves 95 formed in the side walls 93, 94 enhance the ornamental appearance of the casing, and may also be employed as guides for receiving complementary parts carried by a standard or other support (not shown).

The casing 40 is closed by means of a cover of which the front wall 90 forms a part, the cover 104 also including a laterally extending flange 105, about the border of the front wall 90, the flange 105 being adapted to register with the top, bottom and side walls of casing 40. The flange 105 is preferably recessed at 106, forming a relatively thin aligning flange 107, adapted to be received within the walls of casing 40 to align the cover 104 with casing 40 and definitely determine the assembled position of cover and casing.

The cover 104 may be secured to casing 40 by a plurality of screw bolts 108, 109, which pass through the cover, having their heads embedded in countersunk recesses 110, and having threaded ends engaging threaded bores which are formed in lugs 111, 112 carried within casing 40 by the walls thereof.

Casing 40 is preferably provided with a pair of handles 96, one located on each of the side walls of the casing, and the handles 96 are preferably formed of electrical insulating material, such as a molded phenolic condensation product, called "bakelite". Handles 96 may be very firmly secured to the casing 40 by providing the upper end 97 of the handle with a transverse groove 98 which is adapted to receive the upper corner of the casing 40, so that the handle engages both the side wall 94 and the top wall 89.

The handle may be provided with threaded bores 99, 100, and secured to the casing by screw bolts 101, 102, which pass through the walls of casing 40, and the upper screw bolt 101 is preferably provided with a frusto-conical nut 103 adapted to be received in the corner in the interior of the casing, between the top wall 89 and side wall 94. The handle being drawn into firm engagement with both the top wall and the side wall by the bolt 101, and being also secured by the bolt 102, the handles are adapted to be firmly secured to the casing with a minimum amount of labor.

The handles 96 are also a great convenience for the housewife in the manipulation of the mixer since either hand may be used for steadying the mixer in pulverizing operations or other operations which require steadying, and the other hand may be used for controlling the speed of the motor.

The support or control of the device may be readily shifted from one hand to the other to enable the operator to reach for ingredients on either side, and if necessary both handles may be grasped in such manner that the motor unit may be held very firmly and a considerable amount of force brought to bear upon the work where the motor is used for other operations than food mixing.

The speed reduction mechanism 88 also forms a unitary part of the motor unit, being enclosed in the casing 40, and permanently secured thereto, so that no gears or other mechanism need be attached to the agitator unit, and the operator need have no hesitancy about placing the agitator unit in the water for washing on account of gears or other mechanism such as are used in the devices of the prior art.

Since the present agitator unit includes a pair of beater elements, the motor unit has been provided with a pair of drive shafts 34, 35, but it should be understood that it is not necessary to utilize both of the drive shafts when the motor is employed with other appliances. The bottom wall 41 of casing 40 may be provided with a pair of bores 113, for receiving bushings 32, 33, which form bearings for shafts 34, 35.

Referring to Fig. 5, it will be observed that each of the bushings 32, 33 has an axial bore 114 forming the bearing, an annular flange 115 engaging the inside of the bottom wall 41, and a threaded portion 116 for engagement with an internally threaded cap 117.

The bearing structure of each of the drive shafts is substantially identical, and consequently, only one of these structures need be described in detail. The drive shaft 34 is fixedly secured at its upper end to a combined bevel and spur gear 118, while the drive shaft 35 is secured in a similar manner to a spur gear 119, which is adapted to mesh with the teeth on the spur gear 118. All of the gears included in the present device may be made of cast metal and secured to the drive shafts by casting the gear about one end of the shaft, or the gears may be made out of fiber for the purpose of giving a more silent operation, in which case, the gears may be secured to the shaft by pins or other fastening means.

For the purpose of assembly, each of the drive shafts 34, 35, its bearing and gear, preferably consist of a unitary assembly, which is held together by the provision of an annular groove 120 formed in the shaft just below bushings 32, 33, and provided with a split ring 121 to prevent removal of the shaft from its bearing. Washers may be placed on either side of the split ring and an absorbent packing 122 carried in the cap 117 is adapted to prevent leakage of oil out of the bore 123 along the drive shaft. Each drive shaft assembly is also provided with a plate 124 confined between the hub of its respective gear and the bearing 32, and rotation between the bearing 32 and casing 40 is prevented by a pin 125. The bearings 32, 33 may be provided with a supply of lubricant by a piece of absorbent felt 126, which is placed on the bottom of the casing 40 about the annular flanges 115 of the bearing, and secured in place by the plates 124.

In order to provide a self-locating drive connection between the electric motor unit and the two-element agitator unit, one of the drive shafts, such as shaft 34, is made substantially longer than the other shaft 35, so that the shaft 34 projects below shaft 35. Both of the shafts have non-circular ends, the non-circular formations extending upward to a point within the bearing caps 117 on each shaft, and the complementary non-circular sockets 75 on tubular shafts 74 may be of sufficient length to receive either of the shafts, in order to secure standardization of parts.

Since the drive shafts 34, 35 are located with their gears 118, 119 enmeshed in such relative position that when the motor unit is assembled with the agitator unit, as shown in Fig. 1, the paddles 62 or 63 on one beater element 61 are located midway between the paddles on the other beater element in such manner that the paddles rotate between each other without interference. The paddles themselves are adapted to approximate this position even when the agitator unit is removed as in Fig. 2, on account of the interengagement with the paddles 62, 63, and the shafts 34, 35 are preferably provided with tapered portions 127 at their lower ends for engagement with the upper ends of the tubular shafts 74, so that the tapered surfaces 127 are adapted to automatically cam and rotate the tubular shafts 74 until they reach the proper rotative position for engaging the non-circular ends 128 of shafts 34, 35. As previously stated, when the tubular members 74 are actually engaged upon the squared end 128 of the drive shafts, the paddles 62, 63 are definitely placed with respect to each other, so that the paddles on one shaft rotate between the paddles on the other shaft without touching.

Since the agitator unit is adapted to be slid upon the lower part of the motor unit in securing these parts together, some difficulty might be encountered in aligning the mechanism in this sliding operation were it not for the fact that a self-locating means is provided in the form of the elongated shaft 34, which operates as follows.

When the supporting plate 23 approaches the bottom of the motor unit, it is a relatively easy matter to find one of the sockets in the non-circular end of one shaft 74 by means of the elongated shaft 34. The shape of the supporting plate itself with a centrally located depression 31, aids in directing the drive shaft 34 to the proper position, and the shaft 34 slides easily into its tubular member 74. With the parts in this position and the agitator unit only connected with one elongated shaft, the agitator unit may be rotated on its axis with respect to the motor unit until the side flanges 38 become aligned with lugs 25, after which the supporting plate 23 may be pushed up into the position of Fig. 5, the shaft 35 being received in its tubular member 74.

This capability of first locating one elongated shaft is of further assistance in quickly connecting the agitator unit to the motor unit, although the squared ends of the beaters 61 may not be in quite the proper position to receive the squared ends of shaft 34. A slight rotation of the beater unit will bring the beater in position to engage the squared end of the shaft, after which the agitator unit may be rotated back to the proper position for sliding the cupped plate 23 about the lugs 25 and body 42. The second tubular shaft is then located with sufficient accuracy by the interengagement of its paddles with the paddles of the shaft already located, and the tapered ends 127 of the drive shafts complete the connecting operation without difficulty.

It will thus be observed that the present connection between the beater unit and motor unit with a pair of shafts may be very readily and easily affected by the mechanism provided, and the agitator unit is quickly attachable, as well as quickly detachable.

The speed reduction mechanism 88 also includes a pinion 129 carried by the armature shaft 130, a spur gear 131 rotatably mounted upon a shaft 132, the spur gear being also provided with a bevel pinion 133 fixed to rotate with gear 131. The rear wall 91 of casing 40 may be provided with an internally projecting lug 134, having a bore 135 which is in alignment with a bore 136 located in a similar lug 137 carried by cover 104. Shaft 132 may have a knurled end 138, and may be provided with a thrust bearing consisting of a collar 139 pinned to shaft 132. The knurled end 138 may have a drive fit in the bore 135, and the combined spur gear and bevel pinion 131, 133, is rotatably mounted on the shaft 132 between collar 139 and lug 137 with suitable washers 140 to facilitate proper meshing of the bevel gears. The drive shafts 34, 35 are thus adapted to be rotated by the motor armature 141 through the following train of gears; pinion 129 rotates spur gear 131, which carries bevel pinion 133, bevel pinion 133 rotates bevel gear 142 which carries spur gear 118, meshing with spur gear 119, and the spur gears 118, 119 being of the same size, both shafts 34, 35 rotate at the same speed.

The motor 86 may thus be operated at a relatively high rate of speed, such as the most efficient operating speed of the motor. In the embodiment illustrated, the speed reduction gear is adapted to reduce the speed in the ratio of nine to one, and with the speed control, which is described in full hereinafter, the present device is adapted to be operated at speeds of several hundred revolutions per minute to over 1500 revolutions per minute.

The motor shaft 130 is preferably provided with bearings 143 at each end, which are capable of a limited universal movement to automatically align the bearings 143 with shaft 130 when the cover 104 is placed on the casing 40. Each of these bearings may be substantially identical in form, and consequently, only one of the bearings is described in detail.

For instance, the cover 104 is formed with a substantially cylindrical socket 92 having an annular groove 144 located near the mouth of the socket. A stamped annular sheet metal member 145, forming a small portion of a sphere, is adapted to fit within the socket 92 with an outwardly extending flange 146 in groove 144. The bearing 143 comprises a sleeve 143 of bearing metal, which is provided with an annular flange 147 at its outer end, and which is fixedly secured with a ball-shaped metal member 148. The ball 148 fits within the spherical cup 145 and the flange 147 may support a felt packing 149 adjacent an oil conduit 150.

All of the foregoing parts are secured in the socket 92 by an annular plate 151, which is secured in place by screw bolts 152, and which is provided with an annular inwardly sloping flange 153 for engaging ball 148. Any number of washers 154 may be interposed between pinion 129 and bearing 143, and the plate 151 is preferably provided with a stamped depression for engaging in a slot 155 to permit universal movement of ball 148, but to prevent rotation of the ball. The plate 151 is also preferably formed with slots 156 extending into said plate from its outer edge about each screw bolt 152, so that the plate is secured in place by screws passing through resilient tongues formed on plate 151.

Figure 11:
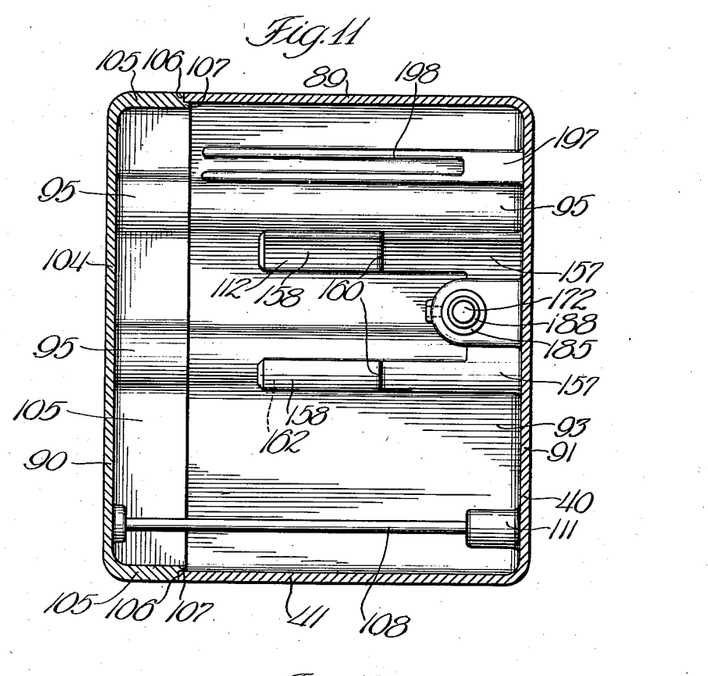
Fig. 11 is a vertical section through the casing alone taken on the plane of the line 11—11 of Fig. 9, with the mechanism removed from the casing.
Figure 12:
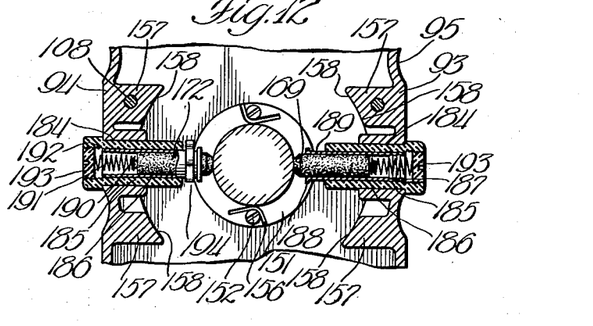
Fig. 12 is a fragmentary vertical sectional view taken on the plane of the line 12—12 of Fig. 8.

Referring to Figs. 9 and 11, it will be observed that the side walls 93, 94 of motor casing 40 are provided with inwardly projecting and transversely extending ribs or formations 157, the lugs on each wall being provided with an inner cylindrical surface 158 which is complementary in shape to the outer surface of the motor field core 159.

At the points 160 on each rib 157, a definite shoulder is formed against which the motor field core 159 rests and the field core may be secured in place by screw bolts and washers 161 threaded in bores 162 in the end of lugs or ribs 157. The motor field core 159 is preferably constructed of a multiplicity of laminations of soft iron, or similar material having high magnetic properties, each lamination being a substantially annular metal plate formed with two inwardly projecting pole pieces 163, 164, the pole pieces being widened at their ends to form grooves 165 for receiving the field windings 166, 167. Each of the field windings 166 consists of a coil of a plurality of turns of relatively heavy insulated wire adapted to carry full load current, since the present device is preferably provided with a series motor.

The armature 144 also comprises a plurality of laminations of soft iron, or other magnetic material, all of which are provided with registering recesses 174 and slots 175 leading to the outside of the armature. The elongated recesses 174 are adapted to receive the armature coils 176, consisting of a plurality of turns of insulated copper wire, the wire being retained in recesses 174 by strips of insulation 176 slid endwise into recesses 174 to close the slots 175. The ends of the respective armature coils 176 are connected to the insulated segments 177 of a commutator 178, fixedly supported on shaft 130, and the commutator 178 is adapted to be engaged by the oppositely disposed brushes 169, 172.

Any compact form of series winding may be used for the armature coils 176, and wire provided with lacquer insulation is preferably employed to reduce the size of the armature and increase its efficiency. The shaft 130 also supports a fan 179, consisting of a sheet metal plate having a plurality of radially extending armatures 180 with inwardly turned blades 181.

The casing 40 and cover 104 are also provided with a plurality of ventilation openings 182 located about each end of the shaft in the front and rear walls, and these walls may also be provided with ventilation openings 183 adjacent the top to provide ventilation for the rheostat 87.

The side walls 93, 94 are provided with bores 184 at points diagrammatically opposite each other with respect to the commutator 178, and the bores 184 support bakelite tubes 185 for insulating the brushes 169, 172. The bakelite tubes 185 are each molded about a sheet metal tube 186, having a crimped end 187 to provide anchoring formations, and the metal sleeves are provided with annular flanges 188 at the inner end, the sleeves 186 projecting sufficiently from the insulating bushings 185 to form a connector 189.

The brushes 169, 172 may consist of carbon rods, each formed with a small head 190, about which one end of a helical spring 191 may be engaged. The insulating bushings 185 are provided with internal threads 192, and an insulating screw plug 193 is threaded in the end of each bushing 185 to compress the helical springs 191 and maintain the brushes 169, 172 in engagement with commutator 178. The connectors 189 are peculiarly adapted to receive the resilient clamping fingers 194 of connectors carried by conductors leading from the field coils 166, 167.

The speed control device 87 preferably consists of a series rheostat, including a plurality of resistance windings 195, the various turns of which may be successively connected in series with the armature and field circuit of motor 86 by a movable switch arm 196.

Referring to Fig. 11, it will be observed that the side walls 93 and 94 are each provided with transversely extending ribs 197 adjacent the top, the ribs 197 having longitudinal slots 198 for slidably receiving the edges 199 of an insulating support 200 for rheostat 87.

The insulating support 200 may consist of a molded porcelain member or plate of substantially rectangular form preferably provided with upwardly projecting and downwardly projecting flanges 201 at each end to form a barrier between the contacts and other metallic parts of the rheostat, and the casing 40. The rheostat is retained in its guides 198 by engagement of the flanges 107 of the cover with the edges 199 of the porcelain.

The porcelain supporting plate 200 of rheostat 87 is provided with a plurality of apertures 202, located in two series along two concentric arcs, and the apertures 200 provide means for securing a plurality of rheostat contacts 203, each of which consists of a sheet metal cup or head, having a pair of downwardly extending prongs 204 for clamping the contact to the porcelain.

The resistance windings 195 consist of a plurality of spaced turns of resistance wire, and the contact bodies 204 form contact with the turns 195 by the engagement of the lower sides 205 of contacts 203 with adjacent turns of the coils 195.

The last contact 173 is preferably provided with a downwardly extending metal flange 206 provided with a screw 207, forming a connector for connection with one of the supply conductors. The porcelain body 200 is also provided with an upwardly projecting lug 208 for supporting an elongated metal strip 171 forming one of the contacts of the rheostat 87.

The elongated metal strip 171 has one end supported in a recess 209 formed in a flange 201, and the opposite end is bent downward and passes through an aperture in the porcelain body 200, to form a connector 210, provided with a screw 211. The metal strip 171 is also provided with a punched tongue 212, which is bent downward through another aperture in porcelain body 200 and bent into engagement with the bottom of the porcelain body to secure the elongated contact strip 171 on the porcelain body 200.

The upper wall 89 of casing 40 is provided with a centrally located bore 213 for receiving an insulating thumb piece 214, and the thumb piece 214 is provided with a portion 215 of reduced diameter, forming a shoulder 216 for engaging the top of the casing. The thumb piece 214 is preferably provided with a screw bolt 217, having its head molded in the thumb piece 214, and having a flattened lower portion for non-rotatably supporting a movable contact 196. An insulating washer 218 is interposed between the movable contact 196 and the casing wall 89, and the contact 196 is secured on bolt 217 by a nut 219.

Figure 7:
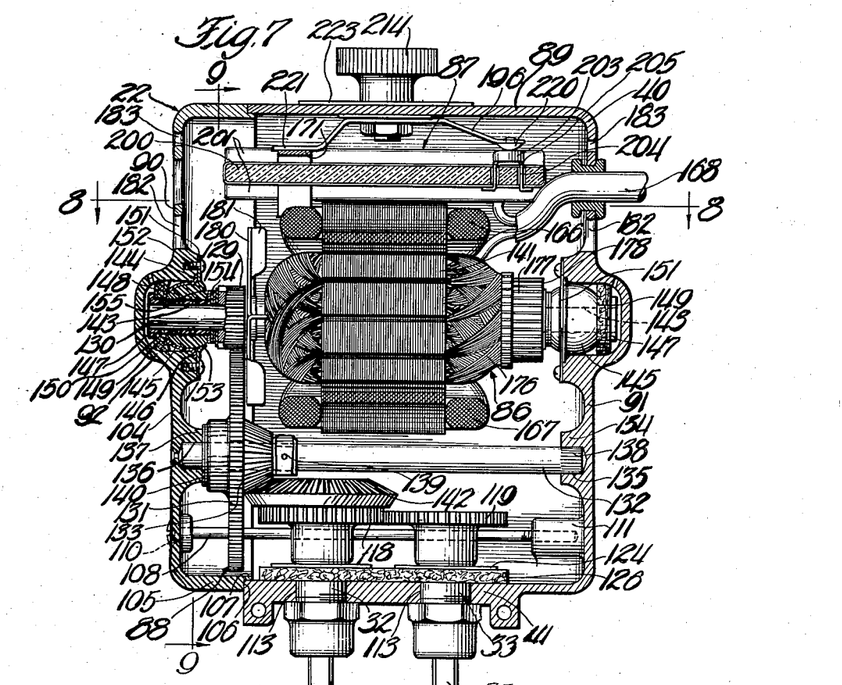
Fig. 7 is a vertical sectional view taken through the motor unit upon a plane determined by the axis of the armature shaft with certain of the parts in elevation.
Figure 8:
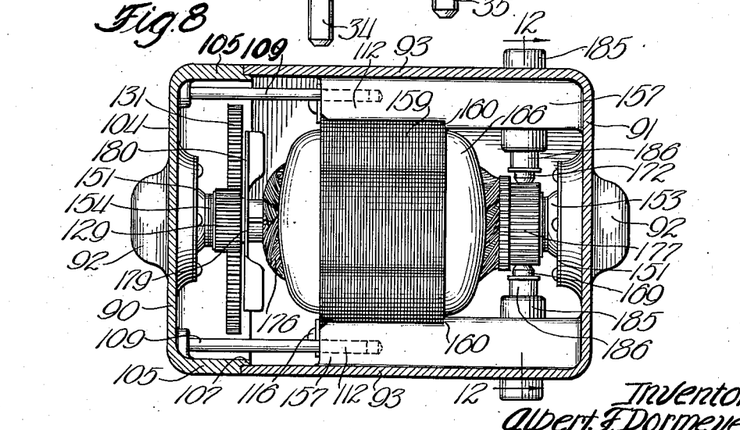
Fig. 8 is a horizontal sectional view taken on the plane of the line 8—8 of Fig. 7, looking in the direction of the arrows.

Referring to Fig. 7, it will be observed that one end of contact arm 196 is provided with a contact rivet 220, having a curved face for slidably engaging the contact bodies 203, 173, and the opposite end 221 of contact arm 196 is adapted to engage the elongated strip contact 171. The porcelain body 200 is also provided at one side with a porcelain projection 222, simulating the shape of a contact 203 and adapted to serve as a dead contact for the off-position of the switch arm 196.

The nameplate 223 may be interposed between the thumb piece 214 and casing wall 89, and the wall or nameplate is preferably provided with indicia, such as "on" or "off" with appropriate arrows, or a scale for indicating the various positions of switch arm 196.

One end of coil 166 is connected to one of the wires leading to the supply conductors 168, while the other end of coil 166 is connected to one of a pair of brushes 169. One end of coil 167 is connected by conductor 170 to the elongated fixed contact 171 of the rheostat 87, and the other end of coil 167 is connected by a conductor to brush 172. The last contact 173 of a series of rheostat contacts is the other terminal of the rheostat which is connected to the other wire of the supply conductors 168.

It will thus be observed that the rheostat 87, field coils 166, 167, and armature coils 176 are adapted to be connected in series by means of the switch arm 196, and when the switch arm 196 rests on the dead contact 222, the circuit is broken through all three of these elements.

Since one end of the motor circuit is connected by conductor 170 to one end of the elongated fixed contact 171, the movable contact 196, which engages the strip 171, is adapted to connect in the circuit various turns of the resistance wire 195, depending upon engagement of the contact 220 with the various rheostat buttons 203. When the contact 220 is in engagement with the upper rheostat contact 203 in Fig. 10, the entire set of resistance windings 195 is in circuit, so that the second position of the thumb piece 214 provides the slowest rate of speed. When the contact 220 is moved to the position to engage the second rheostat contact 203A, one-fourth of the resistance wire 195 is cut out, and three-fourths of the rheostat resistance is in circuit, and so forth. When the contact 220 has reached the last rheostat contact 173, all of the resistance is cut out, and the motor operates at its highest speed.

The mechanical operation of the foregoing food mixer will be evident from the foregoing description and statement of the functions of the various parts. However, the present combination of series rheostat control, series motor and speed reduction device are particularly effective for the purpose of providing a food mixer or household power unit having a wide range of adaptability and speed control for various purposes.

The series commutator motor is capable of operation on either direct or alternating current at ordinary lighting circuit voltages, and the characteristics of the motor are such that the motor is equally adaptable to mashing potatoes or mixing heavy batter at slow speeds as it is to the high speed mixing of relatively thin liquids or material to be whipped.

When the mixer is used in a relatively thick batter, the increased resistance tends to decrease the speed of the motor, which decreases the counter-electromotive force generated in the armature, and the motor takes an increased current, providing the necessary power for mixing the relatively thick batter.

While the motor has the inherent capability of decreasing its speed considerably under conditions of such an increased load, the best operation is secured by the use of the series rheostat, which further decreases the speed of the motor and gives a relatively powerful mixing device which operates at a very low speed when mixing heavy or thick batters.

Since the rheostat is in series with the motor, when an increased load is placed upon the series motor having a series rheostat, the increased current makes a larger potential drop across the rheostat, and consequently, reduces the effective voltage on the motor. This reduction in the voltage impressed on the motor gives a proportional reduction in speed which also gives a decreased counter-electromotive force and further results in increased current with increased power and slower speed.

The various steps provided on the rheostat are thus adapted to provide a much wider range of speed control than would be provided by a rheostat with any other arrangement, and the present food mixer has been found to be peculiarly effective and adaptable to all kinds of mixing, performing many operations which have heretofore not been possible with any motor driven food mixer.

It has already been pointed out that the motor unit is compact, light, capable of use with all kinds of motor driven household appliances and economical in its manufacture and assembly.

The agitator unit is also peculiarly adapted to be used for mixing at all rates of speed, and the agitator is capable of extremely high rates of speed without any splashing of the liquid or other ingredients. The mixer may thus be used in bowls which are relatively full without splashing upon the clothes of the wearer and without the loss of any of the material.

One of the most important features is the provision of a portable food mixer, which is capable of standing alone while in operation or while the motor is shut off, and the usefulness of the present device is greatly increased by the provision of such a balanced motor structure having a stable supporting device.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. An improved agitator for food mixers, comprising a tubular shaft, a pair of metal bands bent to circular form and having outwardly projecting ends extending into said shaft, and a metal member driven between said ends and the interior wall of said shaft to secure said shaft and bands together.

2. An improved agitator for food mixers, comprising a tubular shaft, a pair of metal bands bent to circular form and having outwardly projecting ends, and a metal member driven between said ends and the interior wall of said shaft to secure said shaft and bands together, the ends of said bands having edges shaped to engage each other adjacent said shaft.

3. In a portable food mixer, the combination of a motor casing having a series commutator motor in said casing, with a control rheostat located in said motor casing and connected in series with the circuit of said series motor, a pair of drive shafts rotatably mounted in said motor casing, gears connecting said drive shafts and said motor in said motor casing, and a pair of beaters removably mounted on said drive shafts, comprising elongated tubes fitting on said shafts and circular sheet metal strips carried by said tubes.

4. In a portable food mixer, the combination of a motor casing having a series commutator motor in said casing, with a control rheostat located in said motor casing and connected in series with the circuit of said series motor, a pair of drive shafts rotatably mounted in said motor casing, gears connecting said drive shafts and said motor in said motor casing, a pair of beaters removably mounted on said drive shafts, comprising elongated tubes fitting on said shafts and circular sheet metal strips carried by said tubes, and a removable guard member, comprising a base plate and guard strips located to prevent contact between said beaters and a receptacle.

5. A portable food mixer, comprising a motor casing formed with grooves on opposite sides, a rheostat base plate slidably mounted in said grooves, a rheostat control member movably mounted in said motor casing wall, a series electric motor enclosed in said casing and connected in series with said rheostat, a drive shaft rotatably mounted in said casing, a detachable guard member carried by said motor casing, and a beater having one end rotatably mounted on said guard and the other end on said drive shaft, said guard comprising a base plate and a pair of transverse strips carried by said plate about said beater.

6. In a food mixer, the combination of a base plate having a pair of apertures, with a pair of guard strips, each having its ends secured to said base plate and extending substantially parallel to each other, and a pair of beaters having their lower ends rotatably mounted on said guard strips, and having upper shafts, extending through said apertures in said base plate, said strips being secured transversely to each other at the bottom of said guard, and said strips being formed with feet to support said beaters in erect position.

7. In a portable food mixer, the combination of a guard for supporting a motor, a pair of beaters rotatably mounted in said guard, an electric motor carried by said guard, and provided with a casing of polyhedral form, said motor having a horizontal shaft, a pair of vertical drive shafts carried by the lower side of said casing for driving said beaters, and gearing for connecting said shafts enclosed in said casing.

8. In a portable food mixer, the combination of a guard for supporting a motor, a pair of beaters rotatably mounted in said guard, an electric motor carried by said guard, and provided with a casing of polyhedral form, said motor having a horizontal shaft, a pair of vertical drive shafts carried by the lower side of said casing for driving said beaters, gearing for connecting said shafts enclosed in said casing, a motor control switch located at the top of said casing, and an actuating knob for said switch rotatably mounted in said top.

9. In a beater unit for household food mixers, the combination of a shaft having an external cylindrical surface and having a bore in its lower end, with mixing elements comprising a pair of strips of sheet metal, said strips being bent to substantially circular form and having substantially axially extending ends, the ends of said strips being located in said bore, and a metal member frictionally engaging in said bore inside said strips and clamping the ends of said strips against the interior of said bore, the circular strips being arranged in intersecting relation with respect to each other at a point spaced from the end of said shaft.

10. In a beater unit for household food mixers, the combination of a shaft having an external cylindrical surface and having a bore in its lower end, with mixing elements comprising a pair of strips of sheet metal, said strips being bent to substantially circular form and having substantially axially extending ends, the ends of said strips being located in said bore, and a metal member frictionally engaging in said bore inside said strips and clamping the ends of said strips against the interior of said bore, the circular strips being arranged in intersecting relation with respect to each other at a point spaced from the end of said shaft, said strips having registering apertures at their intersection and comprising means in said apertures for securing said strips together.

ALBERT F. DORMEYER.